（12）United States Patent
Fortenbery et al.

(10) Patent No.: US 7,597,185 B1
(45) Date of Patent: Oct. 6, 2009

(54) CONVEYOR AND AIR FILM CHUTE

(75) Inventors: J. David Fortenbery, Charlotte, NC (US); David Patrick Erceg, Concord, NC (US)

(73) Assignee: Mantissa Corporation, Charlotte, NC (US)

( * ) Notice: Subject to any disclaimer, the term of this patent is extended or adjusted under 35 U.S.C. 154(b) by 88 days.

(21) Appl. No.: 11/926,770

(22) Filed: Oct. 29, 2007

(51) Int. Cl.
*B65G 47/22* (2006.01)
(52) U.S. Cl. .................. 198/493; 193/25 A; 406/88
(58) Field of Classification Search ............. 193/2 R, 193/4, 25 A, 25 FT; 198/493; 406/86, 88, 406/89
See application file for complete search history.

(56) References Cited

U.S. PATENT DOCUMENTS

| 3,415,478 | A |   | 12/1968 | Williams, III ............... 214/1 |
| 3,429,544 | A |   | 2/1969 | Williams, III ............ 248/346 |
| 3,651,956 | A |   | 3/1972 | Kornylak .................... 214/1 |
| 3,685,632 | A | * | 8/1972 | Brady ..................... 406/88 |
| 3,773,325 | A |   | 11/1973 | Crossman et al. ......... 273/126 |
| 3,871,585 | A |   | 3/1975 | Crossman et al. ....... 239/553.3 |
| 3,887,187 | A |   | 6/1975 | Crossman et al. ......... 273/126 |
| 4,457,434 | A | * | 7/1984 | Brown et al. ............... 406/88 |
| 4,623,545 | A |   | 11/1986 | Pivonka .................... 426/502 |
| 4,666,726 | A | * | 5/1987 | Pivonka .................... 198/493 |
| 5,110,128 | A |   | 5/1992 | Robbins .................... 273/126 |
| 5,562,368 | A | * | 10/1996 | Newton .................... 406/86 |
| 7,165,918 | B2 | * | 1/2007 | Kruse ....................... 406/93 |

OTHER PUBLICATIONS

A Two-Dimensional Air Table; American Journal of Physics, Nov. 1963; vol. 31, Issue 11, pp. 867-869.
Glasgow Products Inc., Air Conveying Concept; copyright 2003-2010.
Glasgow Products Inc., Typical Applications; copyright 2003-2010.
SailRail Automated Systems, Inc., Indexair Linear; undated, possible prior art.

\* cited by examiner

*Primary Examiner*—James R Bidwell
(74) *Attorney, Agent, or Firm*—MacCord Mason PLLC

(57) ABSTRACT

A package sorting conveyor system including a conveying track, at least one unloading station and an air-film lubricated entrance chute upstream of the unloading station to receive the package. In one of the embodiments, the system further includes a positioner assembly for selectively positioning an outlet of the entrance chute. The air-film lubricated entrance chute includes: a plenum including a plurality of spaced apart apertures and an opening for communicating with an air supply; and a conveying surface in communication with the apertures.

21 Claims, 10 Drawing Sheets

CONVEYOR AND AIR FILM CHUTE

BACKGROUND (1) Field of the Disclosure

The present invention relates generally to package sorting conveyor systems, and, more particularly, to an improved an air-film lubricated entrance chute.

(2) Description of Related Art

Conveyor systems having a number of individual carrying carts have been used for many years to carry and sort products such as shoes and apparel or other items such as mail. Conventional tilt tray sorters discharge their goods onto individual chutes located near each packer. Limitations that had previously plagued package-sorting conveyor systems were the lack of versatility and amount of floor space required by the systems, especially when sorting a variety of items on the same conveyor was desired. In particular, the conveyor systems were not well suited for transmission of differently packaged products having unique friction coefficients and weights since the pitch angles associated with each chute are specially designed to handle a specific product. However, many manufacturers are now sorting or want the option to sort packages together that were previously never mixed such as mixed sorts including both shoes and apparel.

Thus, there remains a need for a new and improved package sorting conveyor system having a conveying track and an improved air-film lubricated entrance chute for receiving packages from the conveying track having a variety of weights and packaging materials.

SUMMARY OF THE DISCLOSURE

The present inventions are directed to a package sorting conveyor system including a conveying track, at least one unloading station, and an air-film lubricated entrance chute upstream of the unloading station to receive the package. The air-film lubricated entrance chute includes: a plenum including a plurality of spaced apart apertures and an opening for communicating with an air supply; and a conveying surface in communication with the apertures.

In various embodiments of the system further includes an air supply. Also, the entrance chute includes a positioner assembly for selectively positioning an outlet of the entrance chute, and may selectively position the outlet between at least a first and a second position. In addition, a forward direction of the package may change about 90° from its initial direction on the conveying track to its direction at the outlet of the entrance chute. Furthermore, the positioner assembly includes drive means, which may include a rotary actuator and or a linear actuator.

In embodiments of the system, the entrance chute may include an inlet adjacent to the conveying track for receiving a package, and the inlet is wider than a front edge of the package. In various embodiments, the entrance chute is a transition zone funnel. Also, in embodiments, the entrance chute includes an upwardly inclined downstream wall located downstream of the inlet for preventing the package from tipping over, and the outlet may be located downstream from the wall, which can optionally have a radius of curvature of between about 6 inches and 2½ feet. In embodiments of the system, the entrance chute may be a series of chutes that can be placed in horizontal or vertical alignment.

In embodiments, the conveying surface for the air-film lubricated entrance chute can be inclined, and further, may include a low-friction, wear resistant polymeric material, such as high-density polyethylene. The conveyor can also include a pair of sidewalls attached to the plenum, and or a fan for circulating air through the opening from an air supply, which can include ambient air. Furthermore, the apparatus can have at least two distinct modes of operation, one of which may include actively moving air through the plenum, and the conveyor may also optionally include means for changing modes of operation.

Accordingly, one aspect of the disclosure is to provide a package sorting conveyor system including (a) a conveying track; (b) at least one unloading station; and (c) an air-film lubricated entrance chute upstream of the unloading station to receive the package, the entrance chute including (i) a plenum including a plurality of spaced apart apertures and an opening for communicating with an air supply; and (ii) a conveying surface in communication with the apertures.

Another aspect of the disclosure is to provide an air-film lubricated entrance chute including (a) a plenum including a plurality of spaced apart apertures and an opening for communicating with an air supply; and (b) a curved conveying surface in communication with the apertures.

Still another aspect of the disclosure is to provide a package sorting conveyor system including (a) a conveying track; (b) at least one unloading station; (c) an air-film lubricated entrance chute upstream of the unloading station to receive the package, the entrance chute including (i) a plenum including a plurality of spaced apart apertures and an opening for communicating with an air supply; and (ii) a curved conveying surface in communication with the apertures; and (d) a positioner assembly for selectively positioning an outlet of said entrance chute.

These and other aspects of this disclosure will become apparent to those skilled in the art after a reading of the following description of the preferred embodiment when considered with the drawings.

DESCRIPTION OF VARIOUS EMBODIMENTS

Figure 1:
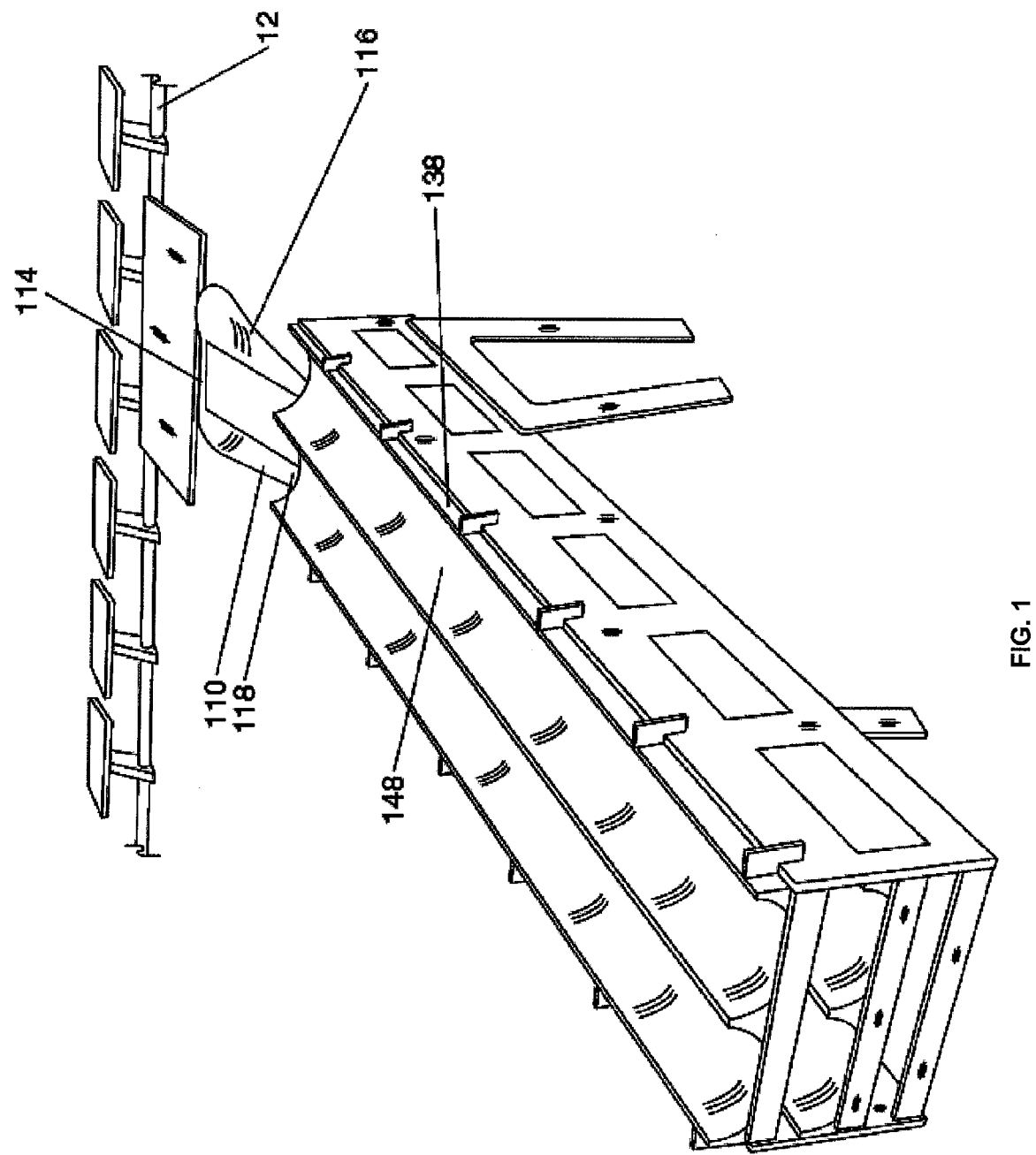
FIG. 1 is a perspective view from the bottom of four secondary downstream chutes showing an air-film lubricated entrance chute and a conveying track constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a sorting conveyor, generally designated 10, is shown constructed according to the present invention for transporting and sorting packages or other objects. The sorting conveyor 10 includes a train of individual carts 20, connected end to end, which preferably form an endless loop around a closed conveyor track 12.

FIG. 1 is a perspective view from the bottom of four secondary downstream chutes 138 looking up at the conveyor track 12. At the top of the four secondary downstream chutes 138 is an entrance chute 110. The inlet 114 of the entrance chute 110 is the side of the entrance chute 110 closest to the conveyor track 12, where packages enter the entrance chute 110. The entrance chute 110 also includes an upwardly inclined downstream wall 116 for guiding packages into the entrance chute 110. The four secondary chutes 138, any of all of which may include a low-friction, curved surface 148, are downstream from the entrance chute 110.

Figure 2:
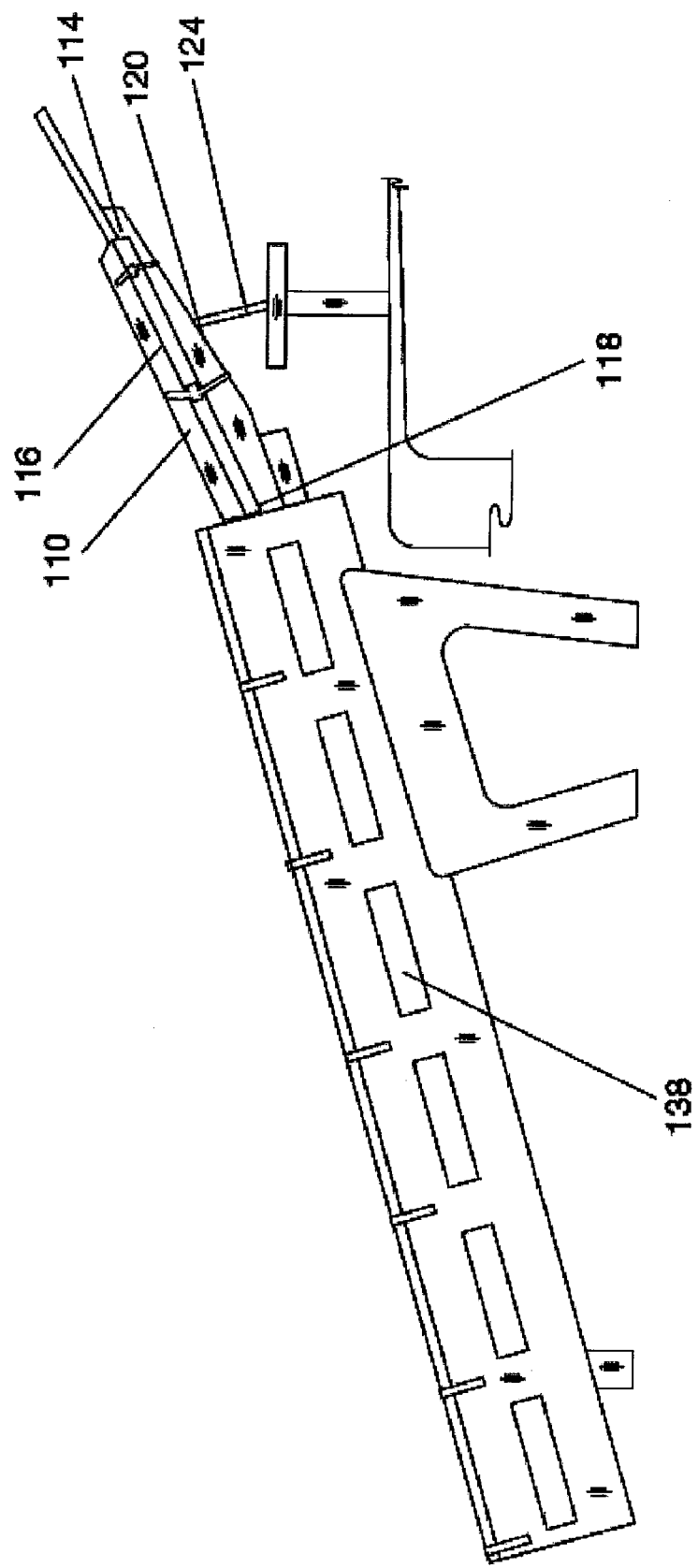
FIG. 2 is a side view of the entrance chute and the four secondary downstream chutes.

FIG. 2 is a side view of the entrance chute 110 and the four secondary downstream chutes 138. The positioner assembly 120 selectively moves a entrance chute outlet 118 into alignment with one of the four secondary downstream chutes 138.

Figure 3:
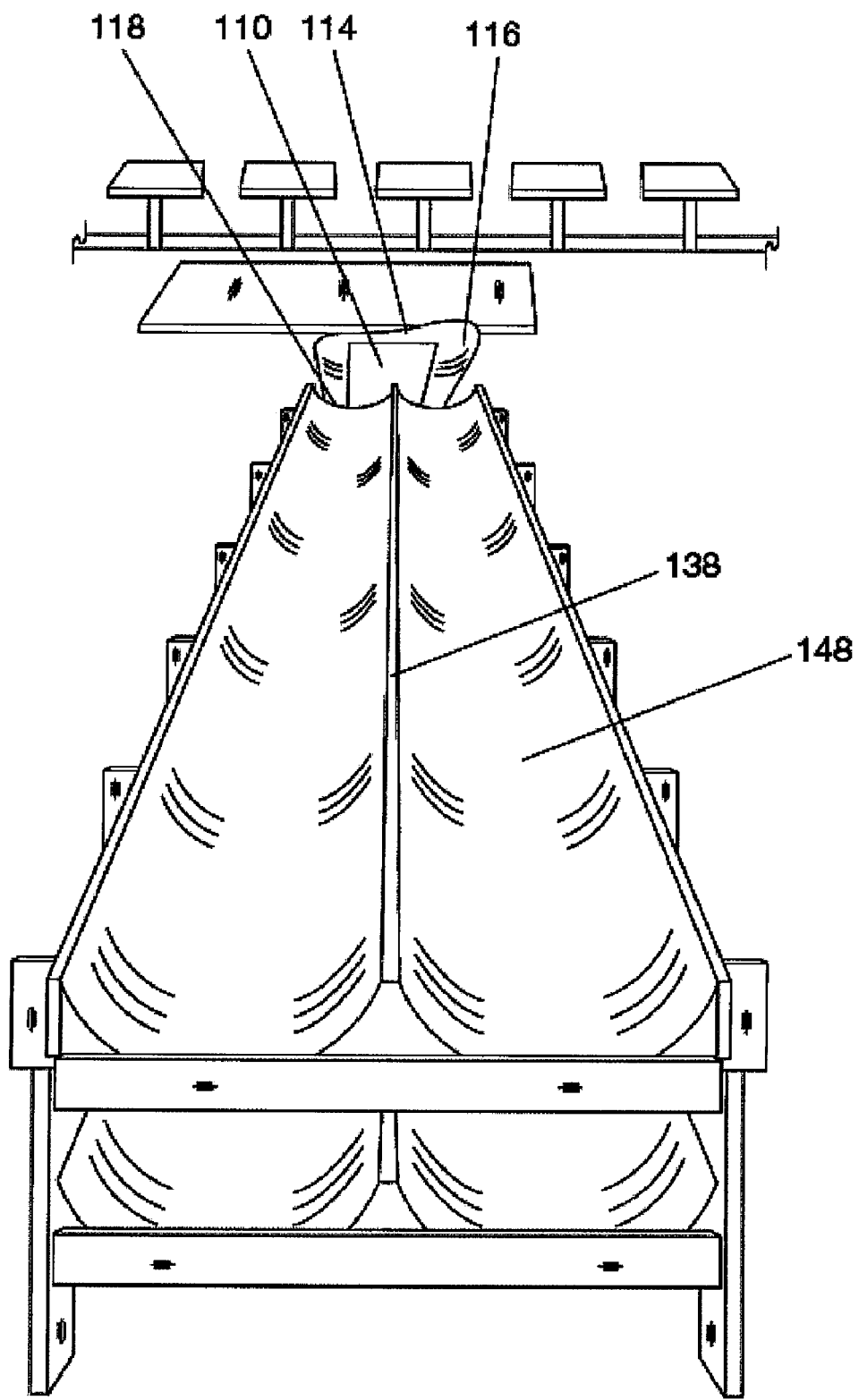
FIG. 3 is an end view of the four secondary downstream chutes and the entrance chute also showing the entrance chute and a conveying track.

FIG. 3 is an end view of the bottom of the four secondary downstream chutes 138, each having a low-friction curved surface 148. A pair of chutes rests directly atop and runs along parallel to a pair underneath. At the top of FIG. 3 is the position zone entrance chute 110, including the inlet 114, outlet 118, and upwardly inclined downstream wall 116.

Figure 4:
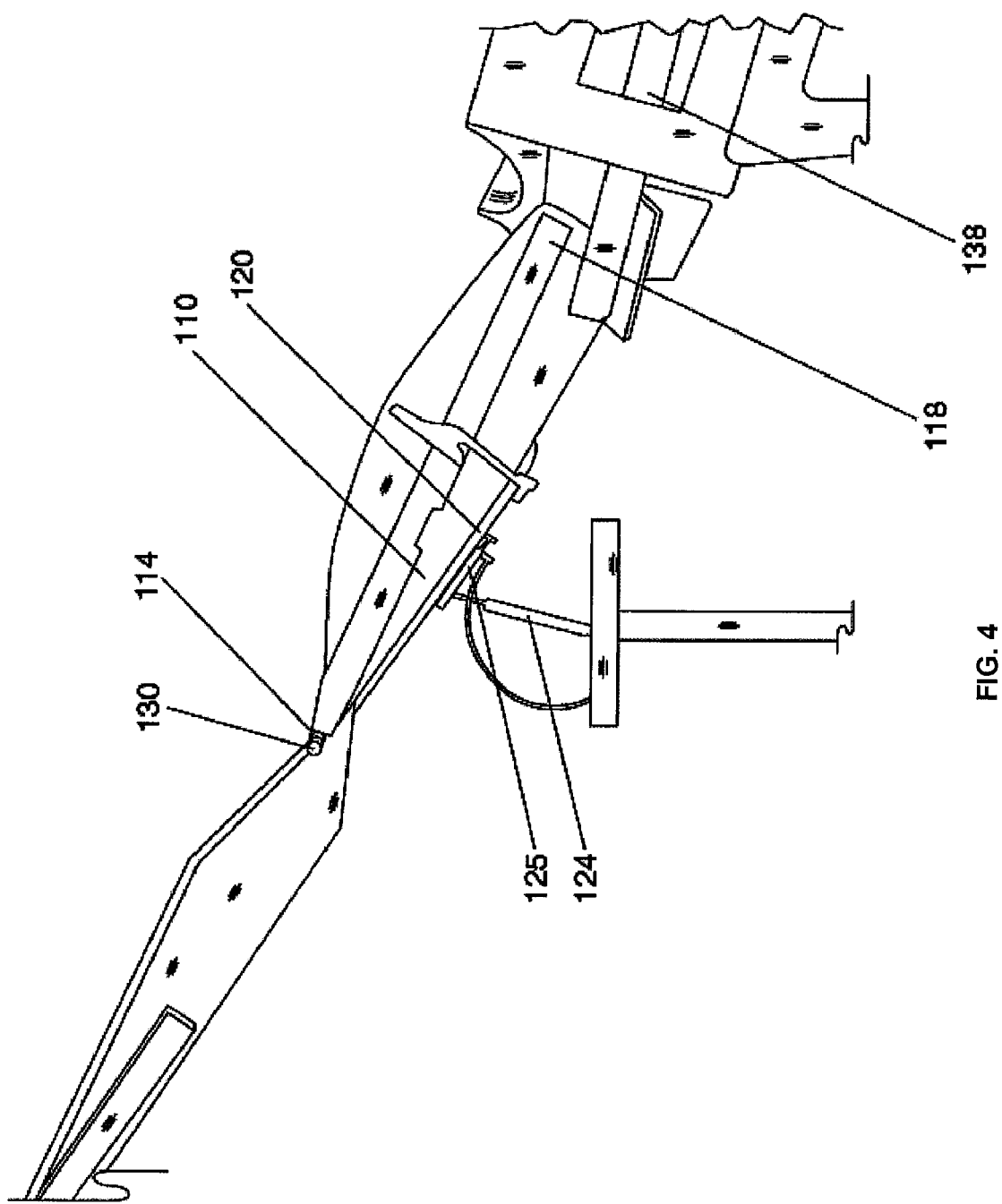
FIG. 4 is a side view of the entrance chute showing a positioner assembly.

FIG. 4 is a side view of the entrance chute 110 including the positioner assembly 120, which includes a rotary joint 126 and a drive means 125 for moving the entrance chute 110 about an axis and a hinge joint 130 and vertical drive means 124 for moving the entrance chute 110 about another axis.

Figure 5:
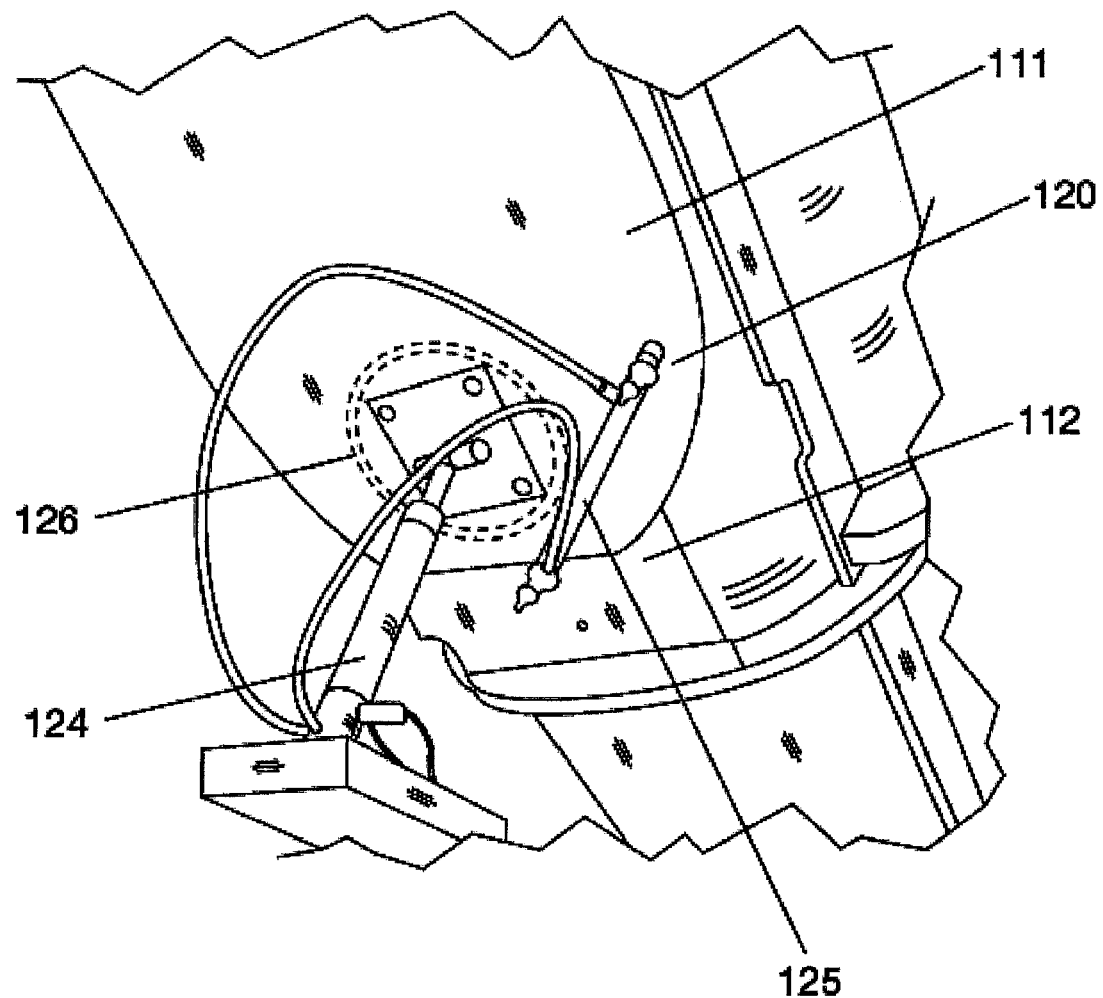
FIG. 5 is a bottom perspective view of the positioner assembly for the entrance chute.

FIG. 5 is bottom perspective view of the positioner assembly 120 including a lower plate 111 and an upper plate 112. Also shown is the rotary joint 126 and drive means 125 and the vertical drive means 124 for moving the entrance chute 110.

Figure 6:
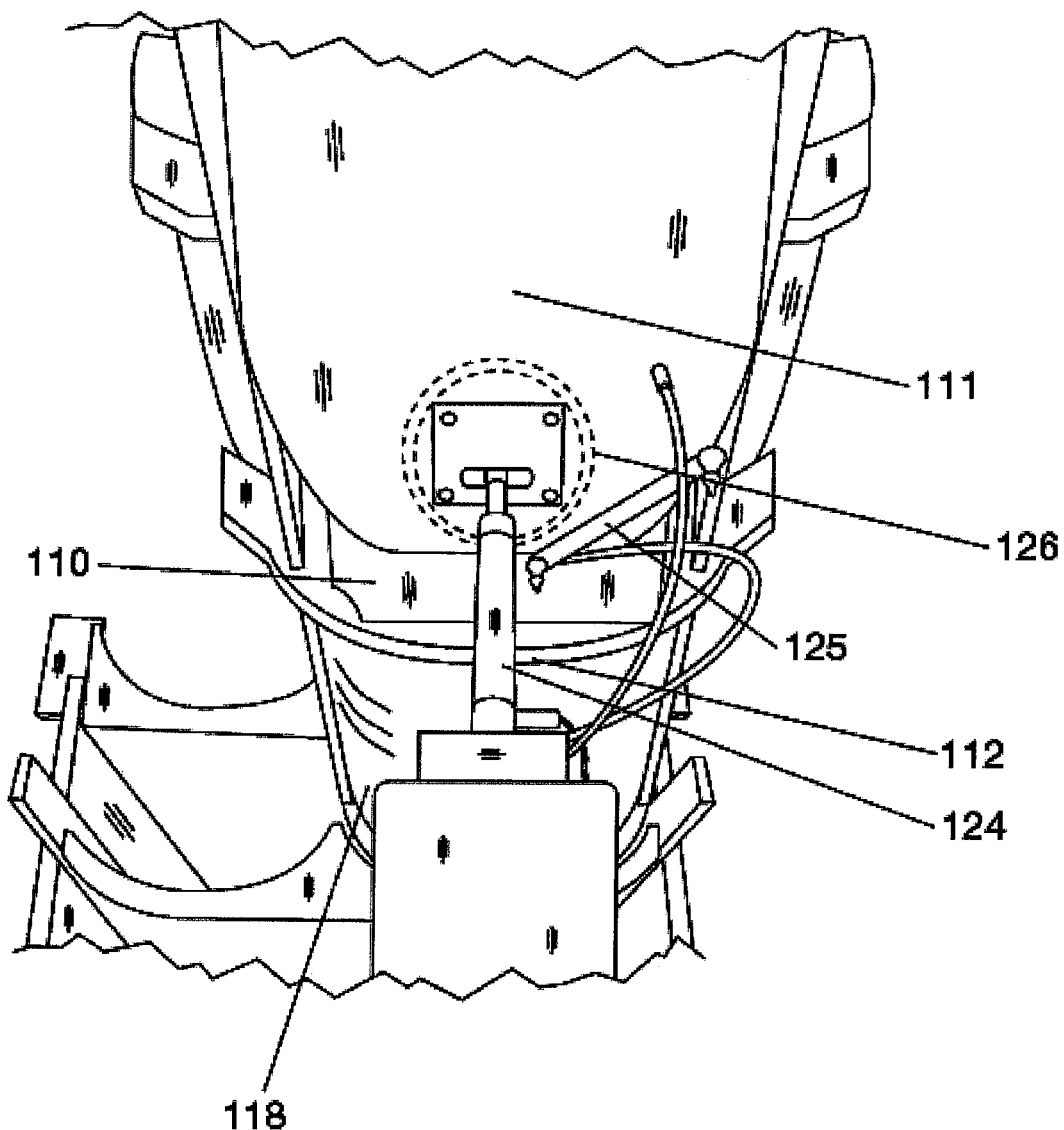
FIG. 6 is a bottom rear view of the positioner assembly for the entrance chute.

FIG. 6 is a rear bottom view of the positioner assembly 120 including the upper 112 and lower plate 111 of the entrance chute 110. The drive means 124 for moving the entrance chute 110 about an axis, and a drive means 124 for moving the entrance chute 110 about another axis are also shown.

Figure 7:
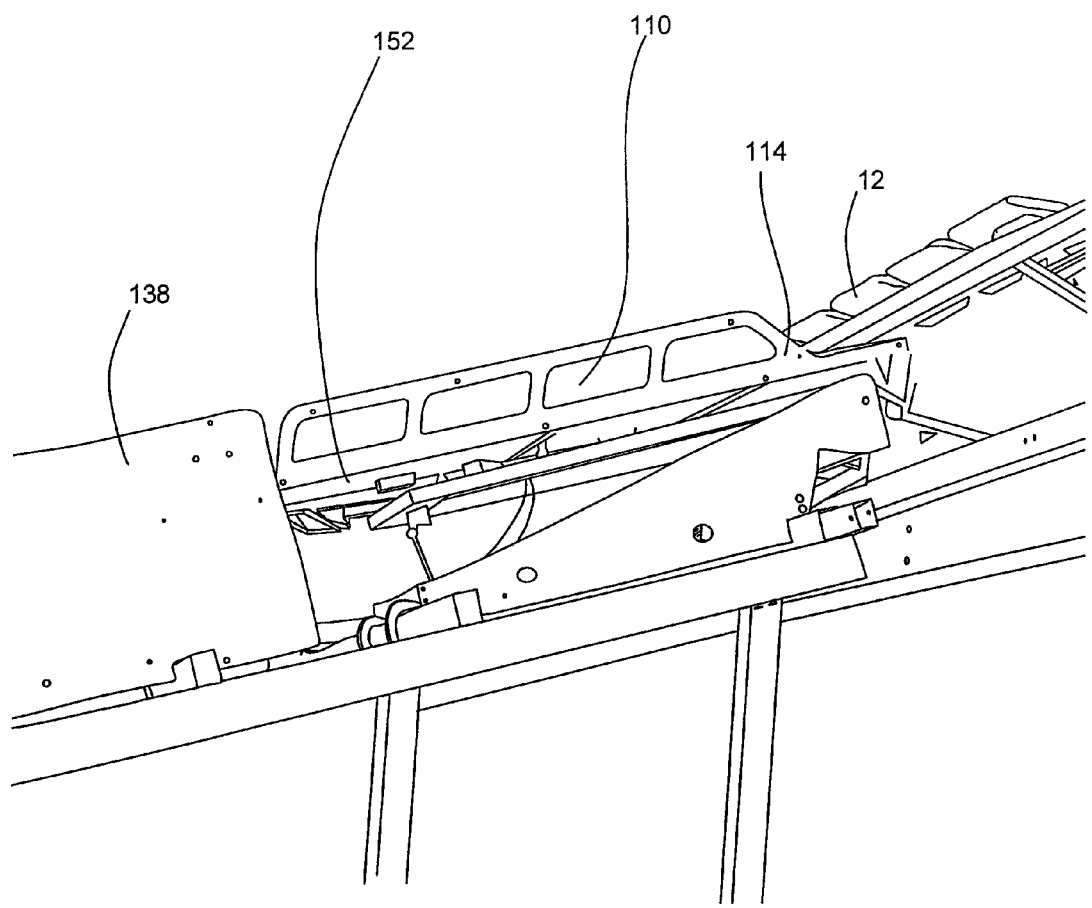
FIG. 7 is a side view of the entrance chute showing a plenum.
Figure 8:
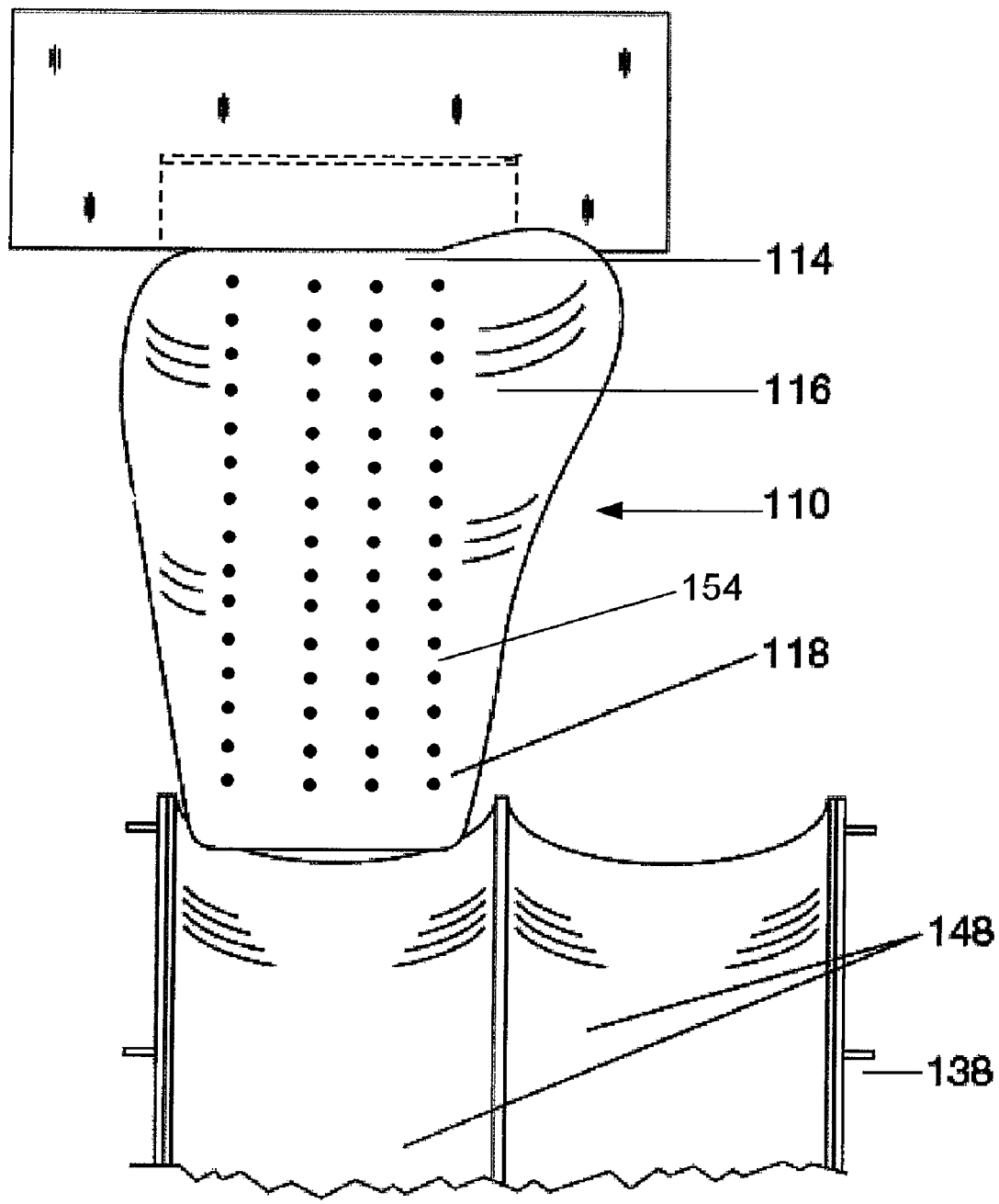
FIG. 8 is a top view of the entrance chute showing a conveying surface.

FIGS. 7 and 8 show a plenum 152 and a conveying surface 154, which is inclined, for a gravity feed, air-film lubricated entrance chute. The conveyor is shown in FIG. 7 as the entrance chute 110, yet the plenum 152 and conveying surface 154 can also form components of one or more of the secondary downstream chutes 138 shown in FIGS. 1-4, which are also exemplary embodiments of the air-film lubricated entrance chute.

Figure 9:
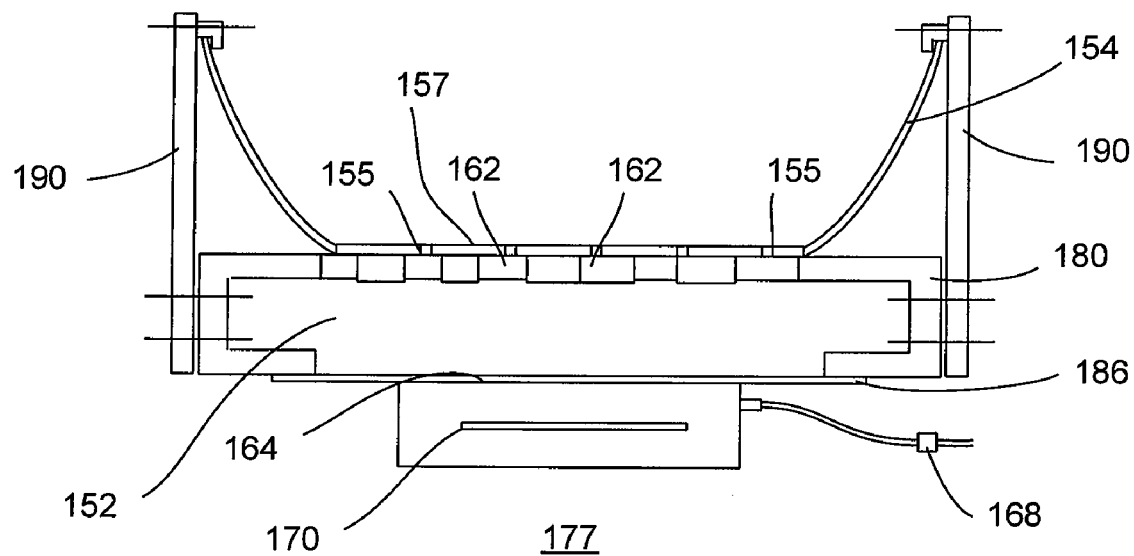
FIG. 9 an end view of an embodiment of a plenum and a conveying surface for the air-film lubricated entrance chute.
Figure 10:
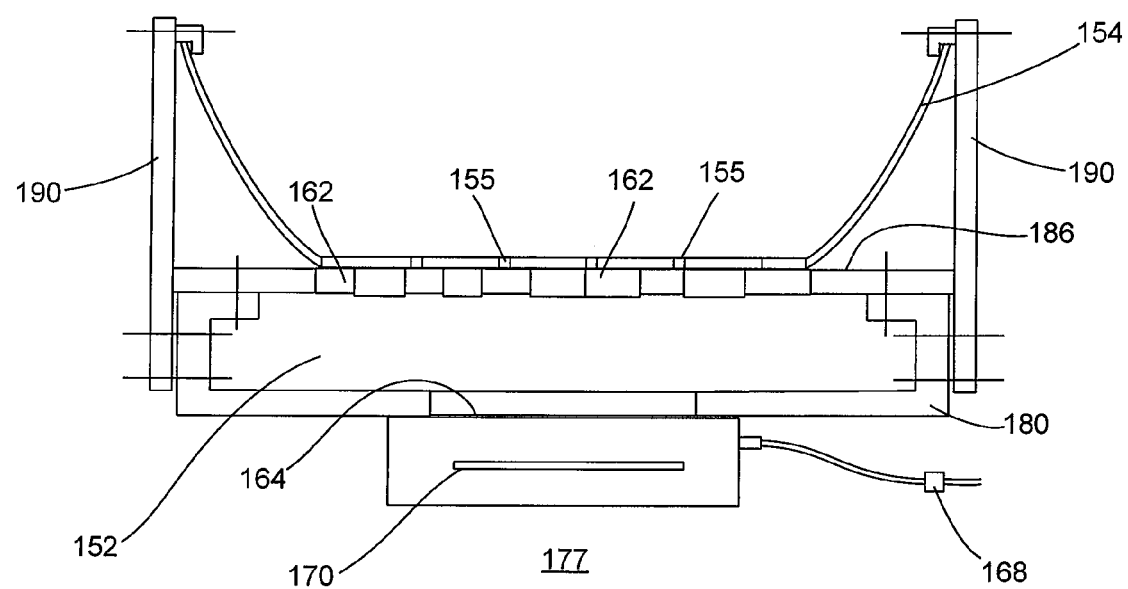
FIG. 10 is an end view of another embodiment of the plenum and conveying surface for the air-film lubricated entrance chute.

FIG. 9 shows an exemplary embodiment of the conveyor including a plenum 152 and a conveying surface 154. The plenum 152 includes a plurality of spaced apart apertures 162 and an optionally larger opening 164 for communicating with an air supply 177. The air supply 177 can include ambient air drawn into or out of the plenum 152 through the opening 164 by a fan 170, but can also be provided by an air compressor, in which case the fan 170 may or may not be employed. The apertures 162 provide passages from the plenum 152 to the conveying surface 154 so that air from the supply 177 is converted into a plurality of air streams at the top 157 of conveying surface 154, which is typically an inclined surface, and may be formed at least in part of a low-friction, wear-resistant, polymeric material, such as high density polyethylene.

FIG. 9 also shows a member 180 having a C-shaped cross-section and including the plurality of spaced apart apertures 162 in one wall, and a removable plate 186 having the opening 164 attached thereto to form a generally rectangular box. The conveyor may also include a pair of opposing sidewalls 190 extending upwardly from the box and positioning between them the conveying surface 154. The surface 154 also includes a plurality of spaced apart apertures 155, at least some of which are positioned above the apertures 162 to provide passages between the plenum 152 and the top 157 of the conveying surface 154. If desired, the apertures 162 can be larger than the apertures 155 to make constructing the conveyor easier and also to provide some allowance for movement of the surface 154 during use of the conveyor. FIG. 9 shows another exemplary embodiment of the conveyor, wherein the C-shaped member 180 includes the opening 164 and the plate 186 includes the plurality of apertures 162.

In operation, a package moves along the conveyor track 12 to an out-feed position where it is discharged into the inlet 114 of the entrance chute 110, with the upwardly inclined downstream wall 116 slowing the forward momentum of the package and guiding the package across the entrance chute 110 into the entrance chute outlet 118. When a box package moves across the entrance chute 110, the entrance chute 110 orients the package such that an end of the package is generally perpendicular to the conveyor track 12 when the box leaves the entrance chute outlet 118. In the preferred embodiment, gravity moves the package along the entrance chute 110 from the inlet 114 to the outlet 118 because the entrance chute inlet 114 is higher than the entrance chute outlet 118. Also, the entrance chute 110 includes a low-friction surface to reduce the coefficient of friction between the package and the entrance chute surface. In an alternative embodiment, the entrance chute includes a powered conveying surface 132 for moving a package across the entrance chute 110.

The positioner assembly 120 selectively moves the entrance chute 110 so that its outlet 118 is aligned with one of four output positions. The positioner assembly 120 includes a vertical drive means 124 and a hinge joint 130, pivotally connecting the entrance chute 110 to the conveyor track 12 along a lower plate 111 of the entrance chute. When the vertical drive means 124 is selectively activated, the drive means 124 exerts a force upon the bottom of the entrance chute 110 in an upward direction, rotating the entrance chute 110 from a lower to an upper position about the hinge joint 130 that connects the entrance chute lower plate 111 to the conveyor track 12. The entrance chute 110 moves by the force of gravity from the upper to lower position.

The entrance chute 110 also includes a rotary joint 126 for connecting the lower plate 111 of the entrance chute 110 to an upper plate 112 of the entrance chute 110. The upper plate 112 is rotated about the rotary joint 126 with a horizontal drive means 125, which selectively operates in opposite directions to move the upper plate 112 of the entrance chute 110 between a right and left position. In the preferred embodiment, the vertical drive means 124 and horizontal drive means 125 of the positioner assembly drive simultaneously, as required, to selectively move the entrance chute 110 between four output positions such that the entrance chute outlet 118 deposits a package into one of the four secondary downstream chutes.

The four secondary downstream chutes 138 are aligned at the end of the conveyor. One pair of chutes rests atop and parallel to another pair below. Each of the four secondary downstream chutes 138 has a low-friction, curved surface 148. In the preferred embodiment, gravity moves packages along the chutes, which 138 decline about 15 degrees from the entrance chute outlet 110 to a position above a floor where an operator removes the packages from the chutes 138.

The air-film lubricated entrance chute as shown in FIGS. 7-10 are capable of at least two distinct modes of operation. In one mode of operation, air is introduced into the plenum 152 through the opening 164 to create a positive air pressure in the plenum 152, and produce a plurality of air streams flowing from the plenum 152 to the top 157 of the conveying surface 154. In another mode of operation, air is not circulated through the opening 164 and thus, the conveyor operates as a gravity feed conveyor without regulation of the top 157 of the conveying surface 154. In yet another mode of operation, air is drawn from the plenum 152 through the opening 164 to produce a vacuum in the plenum 152, which in turn produces a plurality of air streams flowing from the top 157 of the conveying surface 154 into the plenum 152, thereby providing a braking effect. Means for changing the mode of operation of the conveyor can be provided in the form of a switch 168 for supplying electricity to the fan 170, or a vent or bypass valve for preventing or adjusting air flow through the passages formed by the apertures 162 and 155, whether the fan 170 or an air compressor circulates air through the opening 164.

Certain modifications and improvements will occur to those skilled in the art upon a reading of the foregoing description. By way of example, the drive means for controlling the entrance chute angle could be controlled by electric motors of like means, the chutes could be of a general curvature shape, the entrance chute could also use the air assisted apertures in only select portions of the chute instead of the entire chute, the entrance chute could be outfitted with the plenum assembly, and the fans could also reverse spin direction, thus creating negative pressure and create additional frictional forces in desired instances. It should be understood that all such modifications and improvements have not been described herein for the sake of conciseness and readability but may nonetheless fall properly within the scope of the following claims.

We claim:

1. A package sorting conveyor system comprising:
   (a) a conveying track;
   (b) at least one unloading station; and
   (c) an air-film lubricated entrance chute upstream of said unloading station to receive said package, said entrance chute having a outlet and including: (i) a plenum including a plurality of spaced apart apertures and an opening for communicating with an air supply; (ii) a conveying surface in communication with said apertures; and (iii) a positioner assembly for selectively positioning the outlet of said entrance chute.

2. An air-film lubricated entrance chute comprising:
   (a) a plenum including a plurality of spaced apart apertures and an opening for communicating with an air supply; and
   (b) a curved conveying surface in communication with said apertures, wherein the entrance chute is positioned in a mode of operation selected from the group consisting of actively moving air though said plenum to provide an air-film and stopping the air flow or reversing the air flow to provide a braking effect.

3. The apparatus according to claim 2, wherein said curved conveying surface includes a conveying channel having at least one secondary downstream chute located downstream from conveying surface.

4. The apparatus according to claim 3, wherein the at least one secondary downstream chute is spaced horizontally.

5. The apparatus according to claim 3, wherein the at least one secondary downstream chute is spaced vertically.

6. The apparatus according to claim 2 further including an air supply.

7. The apparatus according to claim 6, wherein said air supply is ambient air under pressure.

8. The apparatus according to claim 7, wherein said air supply includes a fan for circulating air through said opening into said plenum and out of said apertures to provide the air-film.

9. The apparatus according to claim 2, wherein the conveying surface is inclined.

10. The apparatus according to claim 2 further including a pair of sidewalls attached to said plenum.

11. The apparatus according to claim 2, wherein said conveying surface includes a low-friction, wear-resistant polymeric material.

12. The apparatus according to claim 11, wherein said material is a high-density polyethylene.

13. A package sorting conveyor system comprising:
   (a) a conveying track;
   (b) at least one unloading station; and
   (c) an air-film lubricated entrance chute upstream of said unloading station to receive said package, said entrance chute including: (i) a plenum including a plurality of spaced apart apertures and an opening for communicating with an air supply; and (ii) a curved conveying surface in communication with said apertures; and
   (d) a positioner assembly for selectively positioning an outlet of said entrance chute.

14. The system according to claim 13, wherein said positioner assembly selectively positions the outlet between at least a first and a second position.

15. The apparatus according to claim 13, wherein said positioner assembly includes a drive means.

16. The system according to claim 13 further including an entrance chute inlet adjacent to said conveying track at an unloading station for receiving a package.

17. The apparatus according to claim 16, wherein said inlet is wider than a front edge of said package providing a wider range of curvature enabling the package to slide off said conveying track onto said inlet.

18. The system according to claim 17 further including an upwardly inclined downstream wall located downstream of said inlet for preventing said package from tipping over by forming a transition zone funnel.

19. The system according to claim 18, wherein said outlet is located downstream from said upwardly inclined downstream wall to discharge said package from said entrance chute.

20. The apparatus according to claim 19, wherein said upwardly inclined downstream wall has a radius of curvature of between about 6 inches and 2½ feet.

21. The apparatus according to claim 20, wherein said upwardly inclined downstream wall has a radius of curvature of about 1 foot and wherein a forward direction of said package changes about 90° from its initial direction on said conveying track to its direction at the outlet of said entrance chute.

\* \* \* \* \*